United States Patent [19]

Chiyoda

[11] 4,308,725
[45] Jan. 5, 1982

[54] REFRIGERANT QUANTITY DETECTING DEVICE FOR AIR CONDITIONING OF VEHICLES

[75] Inventor: Tsuneyuki Chiyoda, Matsuyama, Japan

[73] Assignee: Diesel Kiki Co., Ltd., Tokyo, Japan

[21] Appl. No.: 22,377

[22] Filed: Mar. 20, 1979

[30] Foreign Application Priority Data

Apr. 26, 1978 [JP] Japan .................................. 53/55764

[51] Int. Cl.³ ..................... G01K 13/00; H01H 35/18
[52] U.S. Cl. .................................. 62/129; 200/84 R; 340/623
[58] Field of Search ................. 62/125, 126, 127, 129; 340/624, 623; 200/84 R

[56] References Cited

U.S. PATENT DOCUMENTS

| | | | |
|---|---|---|---|
| Re. 19,700 | 9/1935 | Williams | 62/126 |
| 1,323,113 | 11/1919 | Sprangers | 200/84 R |
| 2,120,825 | 6/1938 | Wolfert | 62/126 X |
| 2,253,260 | 8/1941 | Alcorn | 200/84 R |
| 2,661,411 | 12/1953 | Berger | 340/623 X |
| 2,855,582 | 10/1958 | Tweedale | 340/623 X |
| 2,863,140 | 12/1958 | Eshbargh | 340/624 |
| 2,874,243 | 2/1959 | Metzler | 200/84 R |
| 3,962,696 | 6/1976 | Smith et al. | 340/530 |
| 4,167,858 | 9/1979 | Kojima et al. | 62/129 X |

*Primary Examiner*—William E. Wayner
*Assistant Examiner*—Harry B. Tanner
*Attorney, Agent, or Firm*—Frishauf, Holtz, Goodman & Woodward

[57] ABSTRACT

A device for detecting the quantity of a refrigerant circulating in an air conditioner for vehicles, provided with a sensing means which comprises a body having a hollow portion of a construction open to the outside thereof, projecting into the interior of the refrigerant receiver of the air conditioner. The sensing means also includes a floating element disposed within the hollow portion so as to float on the surface of the refrigerant therein. Thus, the sensing means has excellent resistance to shocks and vibrations, and can also be mounted in the refrigerant receiver even after the latter has been assembled. Also provided is an alarm means electrically connected with the sensing means to be actuated in response to the motions of the floating element, which may comprise a comparator means coupled to a time constant circuit, thus providing a stable alarm operation.

7 Claims, 6 Drawing Figures

REFRIGERANT QUANTITY DETECTING DEVICE FOR AIR CONDITIONING OF VEHICLES

FIELD OF THE INVENTION

The present invention relates to an air conditioner for vehicles, and more particularly to a device for detecting the quantity of a refrigerant circulating in the refrigerating circuit of the air conditioner.

An air conditioner for use in a vehicle such as an automobile has a refrigerating circuit primarily composed of a compressor, a condenser, a refrigerant receiver, and an evaporator. In the conventional arrangement of such an air conditioner, there sometimes occurs a leakage of the refrigerant circulating in the refrigerating circuit through the junctions of the component parts of the refrigerating circuit, so that the refrigerant in the circuit decreases in quantity below a required quantity, resulting in poor cooling. Furthermore, usually a lubricant oil is mixed in the refrigerant for lubrication of the component parts of the compressor. Also, the lubrication oil often leaks out together with the refrigerant through the junctions of the circuit parts. Consequently, an insufficient amount of lubrication oil is supplied to the component parts of the compressor, so that the compressor often undergoes seizure.

In an attempt to eliminate the above-mentioned disadvantages, there has so far been proposed and is generally used a refrigerant quantity detecting device which comprises a sensing means mounted within the refrigerant receiver of the refrigerating circuit. The sensing means is adapted to generate a signal when the quantity of the refrigerant in the refrigerant receiver drops below a required value. This conventional sensing means is essentially comprised of a magnetic sensing element accomodated in a housing uprightly disposed on the bottom of the refrigerant receiver standing upright and an annular floating element floatingly disposed on the surface of the refrigerant in the receiver with a magnet-embedded inner peripheral wall loosely fitted on the housing, wherein said magnetic sensing element is arranged to generate a signal indicative of the level of the refrigerant in the receiver when the floating element comes nearer to or becomes more distant from the magnetic sensing element than a prescribed distance, in dependence on the level of the refrigerant.

However, according to this conventional arrangement, as noted above the floating element is floatingly placed around the housing of the magnetic sensing element, and in addition has a built-in magnet. The floating element therefore is inevitably designed large in size as well as heavy in weight, leading to the following disadvantages: The sensing means cannot fully withstand shocks and vibrations, and also is unsuitable for mounting in a vehicle which generally undergoes large shocks and vibrations in use. Also, there is a limitation in the installation of such sensing means in the refrigerant receiver in that once the receiver has been assembled, it is impossible to mount the floating element into the receiver.

OBJECTS AND SUMMARY OF THE INVENTION

It is a primary object of the invention to provide a device for detecting the quantity of a refrigerant circulating in the refrigerating circuit of an air conditioner for vehicles, which employs a sensor of an improved shock-proof construction using a lightweight and compact floating element. Said sensor is so designed and constructed as to permit mounting into the refrigerant receiver with facility even after the assembly of the receiver has been completed.

It is a further object of the invention to provide a refrigerant quantity detecting device for an air conditioner for vehicles, which comprises a sensor which is so simple in construction that it seldom causes trouble, and can be manufactured at a low cost.

It is another object of the invention to provide a refrigerant quantity detecting device for an air conditioner for vehicles, which is provided with an alarm means capable of performing an accurate and stable indicating action in response to the quantity of the refrigerant in the refrigerating circuit, by minimizing the influence of shocks and vibrations given by the vehicle carrying the air conditioner.

According to the present invention, there is provided a device for detecting a refrigerant quantity circulating in an air conditioner having a refrigerant circuit and a refrigerant receiver disposed upright across the refrigerating circuit for temporary storage of the refrigerant, the device comprising: a sensor which includes a body having a threaded base portion threadedly fitted in the refrigerant receiver through a bottom thereof, a hollow portion extending from the threaded base portion inwardly of the receiver, said hollow portion having an open interior so as to permit the refrigerant to flow therein into a level with the refrigerant in the receiver, a pair of electrodes disposed on an inner end wall of the hollow portion, and a floating element disposed within the hollow portion, said floating element being made of an electrically conductive material having a specific gravity a little smaller than that of the refrigerant; and an alarm means including an electric circuit electrically connected with the electrodes of said sensor.

DETAILED DESCRIPTION OF THE INVENTION

Figure 1:
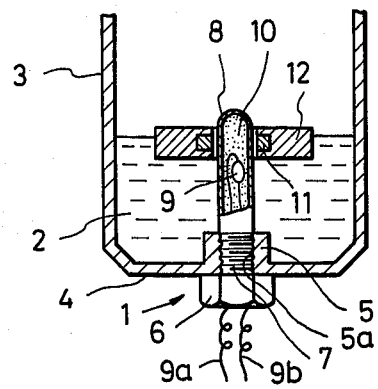
FIG. 1 is a vertical sectional view of a sensing block employed in a conventional refrigerant quantity detecting device.

FIG. 1 illustrates the construction of a sensor used in a conventional refrigerant quantity detecting device. As seen in FIG. 1, the uprightly standing refrigerant receiver 3 in which a refrigerant 2 with a lubrication oil mixed therein is temporarily stored, has a bottom 4 thereof formed with a central tapped through bore 5a to form a sensor mounting portion 5. The body 6 of the sensor 1, which generally has a headed bolt-like configuration, is mounted in the mounting portion 5 with its threaded base portion 7 threadedly fitted in the central tapped bore 5a. The sensor body 6 has a hollow upper portion 8 in which a reed switch 9 is disposed. The interior of the portion 8 is filled with a resin filler 10 as a binder for the reed switch 9. Extending from the reed switch 9 are two lead wires 9a, 9b to connect the switch 9 to an alarm circuit, not illustrated. Loosely fitted on the upper end portion 8 of the sensor body 6 is an annular floating element 12 which has an inner peripheral wall provided with an annular magnet embedded therein. The specific gravity of said floating element 12 is such that the element can float on the surface of the refrigerant with a lubrication oil mixed therein.

The above-mentioned arrangement that the large-sized and heavyweight, magnet-embedded floating element 12 is floatingly disposed around the upper end portion 8 of the sensor body 6 is disadvantageous in respect of shock and vibration resistance. Particularly in a case when the detector is used in a vehicle, the floating element 12 is often hit against the upper end portion 8 of the sensor body 6 due to vibrations produced in the vehicle. Furthermore, the refrigerant receiver 3 is constructed such that the pressurized interior of the receiver 3 is sealed against the outside thereof, and is assembled by integrally jointing two or more parts by means of welding or like means. The sensor 1 provided with the large-sized floating element 12 has to be mounted into the refrigerant receiver 3 at the same time when the recevier 3 is assembled. However, one the receiver 3 has been completed, it is impossible to mount the floating element 12 into the receiver 3. It is therefore necessary to assemble the receiver 3 by welding together the receiver component parts after the sensor has been mounted in the receiver 3 with the floating element 12 loosely fitted on the upper end portion 8 of the sensor body 6. This manner of assembly compels the sensor assembly, which is thus in contact with the receiver component parts, to undergo excessive heating caused by the welding operation, resulting in that the mechanical strength of the sensor 1 becomes degraded due to overheating and the reed switch 9 gets out of order and does not operate properly.

Figure 2:
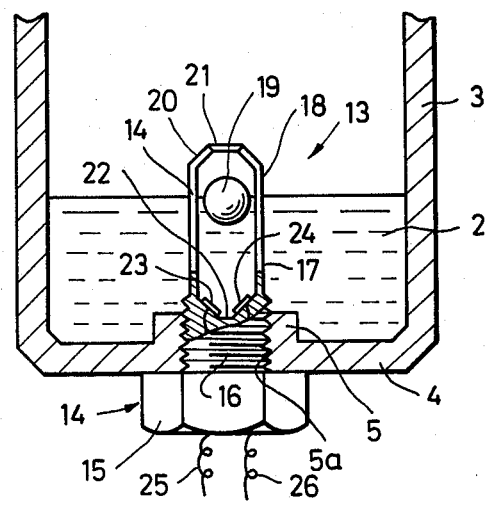
FIG. 2 is a vertical sectional view of an embodiment of the sensing block of the refrigerant quantity detecting device according to the present invention.

Referring now to FIG. 2, an embodiment of the present invention is illustrated. In FIG. 2, reference numeral 13 designates a sensor which constitutes the sensing block of the refrigerant quantity detecting device according to the invention. This sensor 13 comprises a body 14 generally having a headed bolt-like configuration and made of an insulating material, which has a threaded base portion 16 formed adjacent a head portion 15 thereof, threaded into the tapped bore 5a of the mounting portion 5 at the receiver bottom 4. Further extending from said threaded base portion 16 is a hollow upper portion 17 with a little smaller diameter than the threaded base portion 16, which serves as a guide for a floating element, hereinafter described. The hollow upper portion 17 is longitudinally formed with a plurality of slits 18 extending from a lateral wall to a top end thereof. FIG. 2 is a sectional view taken along these slits 18, and accordingly it is noted that two slits 18 are formed in the illustrated embodiment.

The float guide 17 has its interior supplied with part of the liquid refrigerant within the receiver 3 which flows in through the slits 18 and stays there on a level with the refrigerant in the receiver 3. A spherical float 19 made of a metal material having a specific gravity a little smaller than that of the refrigerant 2 is displaceably confined within the interior of the guide 17. The float guide 17 has its top end tapered off so as to form a small aperture 21 in the top surface thereof. Thus, the tapered portion serves to prevent the float 19 from escaping from the float guide 17. The interior of the float guide 17 has a bottom 22 having a substantially V-shaped cross section, on which are disposed two electrodes 23, 24 which angularly face each other. Extending from these electrodes 23, 24 are two lead wires 25, 26 which penetrate the threaded base portion 16 and the head portion 15 of the sensor body 14 to connect the electrodes to an alarm device, not illustrated.

Since the arrangement according to the invention is such as mentioned above, it is feasible to mount the sensor 13 in the receiver 3 merely by screwing the threaded base portion 16 of the sensor 13 into the tapped portion 5 of the receiver 3 after the receiver 3 has been assembled. Therefore, during the mounting operation, the sensor 13 is not subject to heat which would be produced by the welding operation for assembly of the receiver 3. Further, since the float 19 can be made of a small size as well as of a small weight such that it can be confined within the hollow float guide 17 for free movement therein, the construction of the sensor 13 has a higher resistance to shocks and vibrations.

Figure 3:
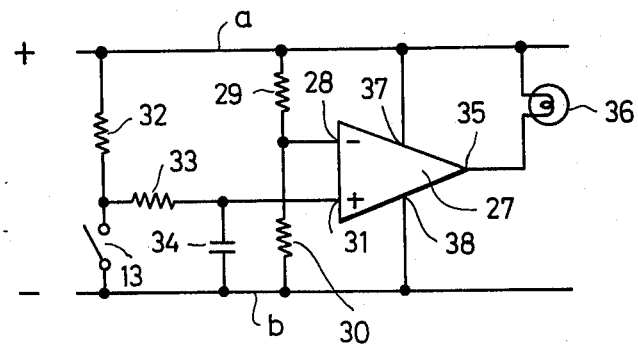
FIG. 3 is a circuit diagram of the processing circuit for use with the sensing block of FIG. 2.

Referring next to FIG. 3, an alarm circuit will be explained which constitutes the processing circuit of the refrigerant quantity detecting device according to the invention and which is adapted to issue an alarm signal in response to the switching action of the sensor 13 of the above arrangement.

The electric circuit shown in FIG. 3 comprises a comparator utilizing a differential amplifier. Reference numeral 27 represents an operational amplifier (differential amplifier), which has a negative or inverting input terminal 28 connected to the junction of resistors 29 and 30 which are connected in series between a positive conductor a leading to a direct current power source, not illustrated, and a negative conductor b which may be grounded. The positive or non-inverting input terminal 31 of the amplifier 27 is connected with the junction of resistors 32, 33 and a capacitor 34 which are connected in series between the positive conductor a and the negative conductor b. The resistors 32, 33 and capacitor 34 form a chargeable circuit having a predetermined time constant. Connected between the junction of the resistors 32 and 33 and the negative conductor b is an ON-OFF switch which is formed by the aforedescribed sensor 13. When the switch is in the ON position, a discharging circuit is formed in which an electric current charged in the capacitor 34 is discharged through the resistor 33 and the switch 13.

An alarm lamp 36, which may be comprised of an LED (Light Emitting Diode), an electric light bulb, or like means, is connected between the output terminal 35 of the differential amplifier 27 and the positive conductor a. The differential amplifier 27 has a feeding terminal 37 connected to the positive conductor a and a ground terminal 38 to the negative conductor b, respectively.

Under the above-described arrangement, assuming that the differential amplifier 27 has a substantially infinite input line impedance (if the amplifier is comprised of an operational amplifier, a substantially infinite input line impedance may be available), a voltage substantially equal to the power supply voltage is applied to the non-inverting input terminal 31 when the switch 13 is off. The ratio between the sum of the resistance of resistor 29 and the internal resistance of lamp 36, and the resistance of resistor 30, that is, the gain of the differential amplifier 27 is set at nearly one, so that when the switch 13 is off, a voltage equal to the power supply voltage is produced at the output terminal 35.

Next, the operation of the detecting device of the invention constructed and arranged as above will be described with reference to FIGS. 2 and 3. When a sufficient quantity of refrigerant is circulating in the refrigerating circuit, a correspondingly large quantity of refrigerant stays in the receiver 3 so that the float 19 is kept in contact with the inner wall of the top tapered portion 20 of the guide 17. That is, the switch 13 is in the open or OFF position, so that the non-inverting input terminal 31 is supplied with a voltage substantially equal to the power supply voltage, and accordingly an output voltage equal to the power supply voltage is produced at the output terminal 35, thus keeping the alarm lamp 30 in a put-out or extinguished state.

A decrease in the quantity of the refrigerant in the refrigerating circuit causes a corresponding decrease in the quantity of refrigerant in the receiver 3, which is accompanied by a drop in the level of the float 19.

When the float 19 further lowers into contact with the contacts 23, 24, these contacts or electrodes become electrically connected together via the float 19 to close the switch 13. Thus, the switch 13 cooperates with the resistors 33 to form a discharging circuit for the capacitor 34 so that the electric potential at the non-inverting input terminal 31 of the amplifier 27 drops to the potential at the negative conductor b. Accordingly, also the potential at the output terminal 35 correspondingly drops to the negative conductor potential, thus turning on the alarm lamp 36.

On such occasion, since the chargeable and discharging circuit connected to the non-inverting input terminal 31 of the differential amplifier 27 has its charging and discharging carried out with some durations corresponding to the time constant given by resistors 32, 33 and capacitor 34, the input voltage applied to the non-inverting input terminal 31 does not instantly and abruptly change but is substantially constant even in the event that there occur very frequently small changes or ripples in the level of the surface of the refrigerant in the receiver 3 which may be caused by vibrations of the vehicle in which the detecting device is installed, particularly when the quantity of the refrigerant is small in the refrigerating circuit, causing frequently repeated contacts of the float 19 with the electrodes 23, 24. Since a stable output voltage is thus available from the differential amplifier 27, which has very small fluctuations, the alarm lamp 36 can be repeatedly turned on and off with respective suitable durations, without being turned on and off each time the float 19 repeatedly has short time contacts with the electrodes 23, 24.

Figure 4:
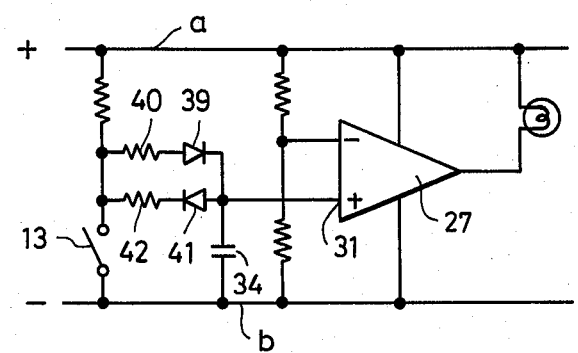
FIG. 4 is a circuit diagram of another embodiment of the processing circuit for use with the sensing circuit of FIG. 2.

FIG. 4 illustrates another example of the alarm circuit applicable to the invention. In the illustrated circuit, two series circuits of a diode 39 and a resistor 40, and a diode 41 and a resistor 42 are connected in parallel with each other, with said two diodes being directed opposite with respect to each other. By this arrangement, it is feasible to set the charging time and the discharging time at any desired values respectively, independently of each other. Thus, alarm signals are available with any desired durations.

Figure 5:
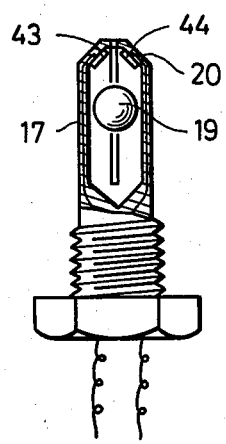
FIG. 5 is a vertical sectional view of another embodiment of the sensing block of the refrigerant quantity detecting device according to the invention.
Figure 6:
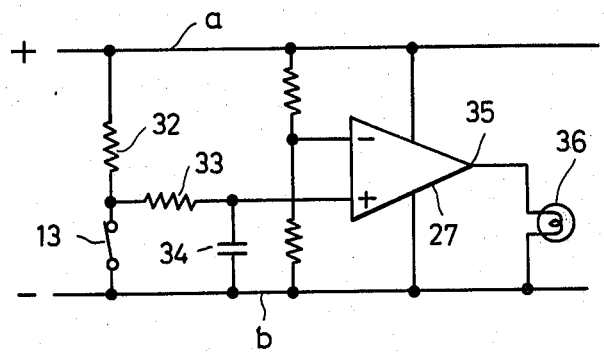
FIG. 6 is a circuit diagram of the processing circuit for use with the sensing block of FIG. 5.

FIG. 5 illustrates another embodiment of the sensor of the refrigerant quantity detecting device according to the invention. A processing or alarm circuit suitable for use in the detecting device of FIG. 5 is illustrated in FIG. 6. In the arrangement of FIG. 5, the paired contacts 43, 44 comprising the switch 13 of FIG. 6 are provided on the inner wall of the tapered end portion 20 of the float guide 17. The arrangement of FIG. 6 is distinguished from that of FIG. 3 only in that the alarm lamp 36 is connected between the output terminal 35 of the differential amplifier 27 and the negative conductor b.

With the FIG. 5 arrangement, if there is a sufficient quantity of refrigerant in the refrigerating circuit, the float 19 is kept in contact with the contacts 43, 44, thus maintaining the switch 13 in the ON position. Thus, the discharging circuit comprised of the resistor 33 and the switch 13 of the alarm circuit of FIG. 6 is actuated to lower the potential of the non-inverting input terminal of the differential amplifier 27, rendering the amplifier 27 inoperative. Accordingly, no output voltage is produced at the output terminal 35 of the differential amplifier 27, with the alarm lamp 36 in its put-out or extinguished state.

Where there is a decrease in the quantity of the refrigerant, the float 19 becomes detached from contacts 43, 44 to open the switch 13 so that the potential at the non-inverting input terminal 31 of the differential amplifier 27 is increased to actuate the differential amplifier 27. A resulting voltage as high as the power supply voltage is produced at the output terminal 35 to turn the alarm lamp 36 on. A warning of the decrease in the refrigerant quantity is thus given.

As set forth above, the refrigerant quantity detector according to the invention has succeeded in overcoming the problems related to heat resistance and shock resistance, and is thus a practically very useful device.

It is to be understood that the foregoing description relates to preferred embodiments of the invention and that various changes and modifications may be made in the invention without departing from the spirit and scope thereof.

What is claimed is:

1. A device for detecting a refrigerant quantity circulating in an air conditioner having a refrigerant circuit and a refrigerant receiver disposed upright across the refrigerating circuit for temporary storage of the refrigerant, the device comprising:

a sensor which includes a body having an integral threaded base portion threadedly fitted in the refrigerant receiver through a bottom thereof, a hollow portion integral with said threaded base portion and extending from the threaded base portion inwardly of the receiver, said hollow portion having an open interior so as to permit the refrigerant in the refrigerant receiver to flow into said hollow portion to a level substantially even with the refrigerant level in the refrigerant receiver; a pair of electrodes disposed on an inner end wall of said hollow portion; and a floating element disposed within said hollow portion, said floating element being made of an electrically conductive material having a specific gravity a little smaller than that of the refrigerant; and an alarm means including an electric circuit electrically connected with said electrodes of said sensor, said alarm means comprising a differential amplifier having two input terminals and an output terminal; means for applying a fixed electric voltage to one of said input terminals of said differential amplifier; a circuit with a predetermined time constant coupled to said electrodes of said sensor and arranged to apply an electric voltage which is variable in response to the action of said sensor to the other input terminal of said differential amplifier; and indicating means substantially directly connected to said output terminal of said differential amplifier for actuation in response to an output from said differential amplifier to indicate when the refrigerant level in said refrigerant receiver falls below a given level.

2. The refrigerant quantity detecting device as recited in claim 1, in which said electrodes are disposed on an inner wall of an end of the hollow portion of the sensor body toward the bottom of said refrigerant receiver, whereby said alarm means is adapted to give an alarm signal when the floating element is in contact with said electrodes.

3. The refrigerant quantity detecting device as recited in claim 1, in which said electrodes are disposed on an inner wall of said hollow portion of said sensor body which is opposite to and most remote from the bottom of said refrigerant receiver, whereby said alarm means is adapted to give an alarm signal when said floating element is out of contact with said electrodes.

4. The refrigerant quantity detecting device as recited in claim 1, in which said hollow portion of said sensor body has a peripheral wall thereof formed with at least one slit for communicating the interior of said hollow portion with the outside thereof.

5. The refrigerant quantity detecting device as recited in claim 2, in which said alarm means further comprises:
a direct current power source; and wherein:
said differential amplifier has an inverting input terminal and a non-inverting input terminal;
said means for applying a fixed electric voltage includes a series circuit of two resistors having one end thereof connected with said direct current power source and the other end thereof connected with a negative conductor, respectively, the junction of said two resistors being connected to said inverting input terminal of said differential amplifier;
said circuit with a predetermined time constant includes a series circuit of a resistor and a capacitor having one end thereof connected to said direct current power source and the other end thereof connected to said negative conductor, the junction of said resistor and capacitor being connected to said non-inverting input terminal of said differential amplifier; and
said indicating means includes an alarm lamp connected between said direct current power source and the output terminal of said differential amplifier, said time constant circuit being arranged to be discharged when said floating element of said sensor comes into contact with said electrodes of said sensor.

6. The refrigerant quantity detecting device as recited in claim 3, in which said alarm means further comprises:
a direct current power source; and wherein:
said differential amplifier has an inverting input terminal and a non-inverting input terminal;
said means for applying a fixed electric voltage includes a series circuit of two resistors having one end connected with said power source and the other end thereof connected with a negative conductor, respectively, the junction of said two resistors being connected to said inverting input terminal of said differential amplifier;
said circuit with a predetermined time constant includes a series circuit of a resistor and a capacitor having one end thereof connected to said power source and the other end thereof connected to the negative conductor, the junction of said resistor and capacitor being connected to said non-inverting input terminal of said differential amplifier; and
said indicating means includes an alarm lamp connected between the output terminal of said differential amplifier and the negative conductor, said time constant circuit being arranged to be discharged when said floating element of said sensor comes into contact with said electrodes of said sensor.

7. The refrigerant quantity detecting device as recited in claim 5, in which said resistor of said time constant circuit comprises two pairs of serially connected resistors and diodes which are connected in parallel with each other with said diodes directed opposite with respect to each other, whereby the starting time and terminating time of operation of said indicating means can be set at any desired respective values by changing the sum value of said two pairs of resistors and diodes, thereby to determine the duration of operation of said indicating means at any desired value.

* * * * *